US 6,728,951 B1

(12) United States Patent
Gibson et al.

(10) Patent No.: US 6,728,951 B1
(45) Date of Patent: Apr. 27, 2004

(54) SYSTEM AND METHOD FOR PERFORMING AUTOMATED INCREMENTAL COMPILATION OF COMPUTER PROGRAMS

(75) Inventors: James Douglas Gibson, Loveland, CO (US); Paul Donald Hylander, Plano, TX (US)

(73) Assignees: Hewlett-Packard Development Company, L.P., Houston, TX (US); Intel Corporation, Santa Clara, CA (US)

( * ) Notice: Subject to any disclaimer, the term of this patent is extended or adjusted under 35 U.S.C. 154(b) by 0 days.

(21) Appl. No.: 09/549,346

(22) Filed: Apr. 14, 2000

(51) Int. Cl.[7] .................................................. G06F 9/45
(52) U.S. Cl. ...................... 717/140; 717/162; 717/163; 717/164; 717/111
(58) Field of Search ...................... 717/140, 162–164, 717/111

(56) References Cited

U.S. PATENT DOCUMENTS

| 5,193,191 A | * | 3/1993 | McKeeman et al. ........ 717/162 |
| 5,204,960 A | * | 4/1993 | Smith et al. ................ 717/145 |
| 5,325,531 A | * | 6/1994 | McKeeman et al. ........ 717/145 |
| 5,519,866 A | * | 5/1996 | Lawrence et al. .......... 717/162 |
| 5,561,800 A | * | 10/1996 | Sabatella .................... 709/331 |
| 5,586,328 A | * | 12/1996 | Caron et al. ................ 717/146 |
| 5,764,989 A | * | 6/1998 | Gustafsson et al. ......... 717/129 |
| 6,519,767 B1 | * | 2/2003 | Carter et al. ................ 717/140 |

FOREIGN PATENT DOCUMENTS

| EP | 0406028 A2 | * | 1/1991 | ............. G06F/9/46 |
| WO | WO 95/00904 | * | 1/1995 | ............. G06F/9/44 |

OTHER PUBLICATIONS

Bivens, Mary P. and Soffa, Mary Lou, "Reuse of Complier Analysis in a Programming Environment", 1989 ACM, retrieved from ACM Portal Oct. 13, 2002.*
Bubenik, Rick and Zwaenepoel, Willy, "Performance of Optimistic Make", 1989 ACM, retrieved from ACM Portal, Oct. 13, 2002.*
Millman, Howard, "C++ tool 'Builder' of Champions", Computerworld, Framingham, May 11, 1998, retrieved from Proquest, Oct. 13, 2002.*
Lewerentz, Claus, "Extended Programming in the Large in a Software Development Environment", 1988 ACM, retrieved from ACM Portal Oct. 13, 2002.*

* cited by examiner

Primary Examiner—Tuan Dam
Assistant Examiner—Mary Steelman

(57) ABSTRACT

A system and method are described for providing automated incremental compilation of computer programs. The system has a library generation logic that generates a dynamic link library of a plurality of computer programs, and a work area creation logic that creates a program work area. A program copy logic copies at least one computer program into the program work area to enable the computer program to be modified. A program generation logic then generates an executable program that includes all of the computer programs in said program work area and the plurality of computer programs in the dynamic link library.

17 Claims, 4 Drawing Sheets

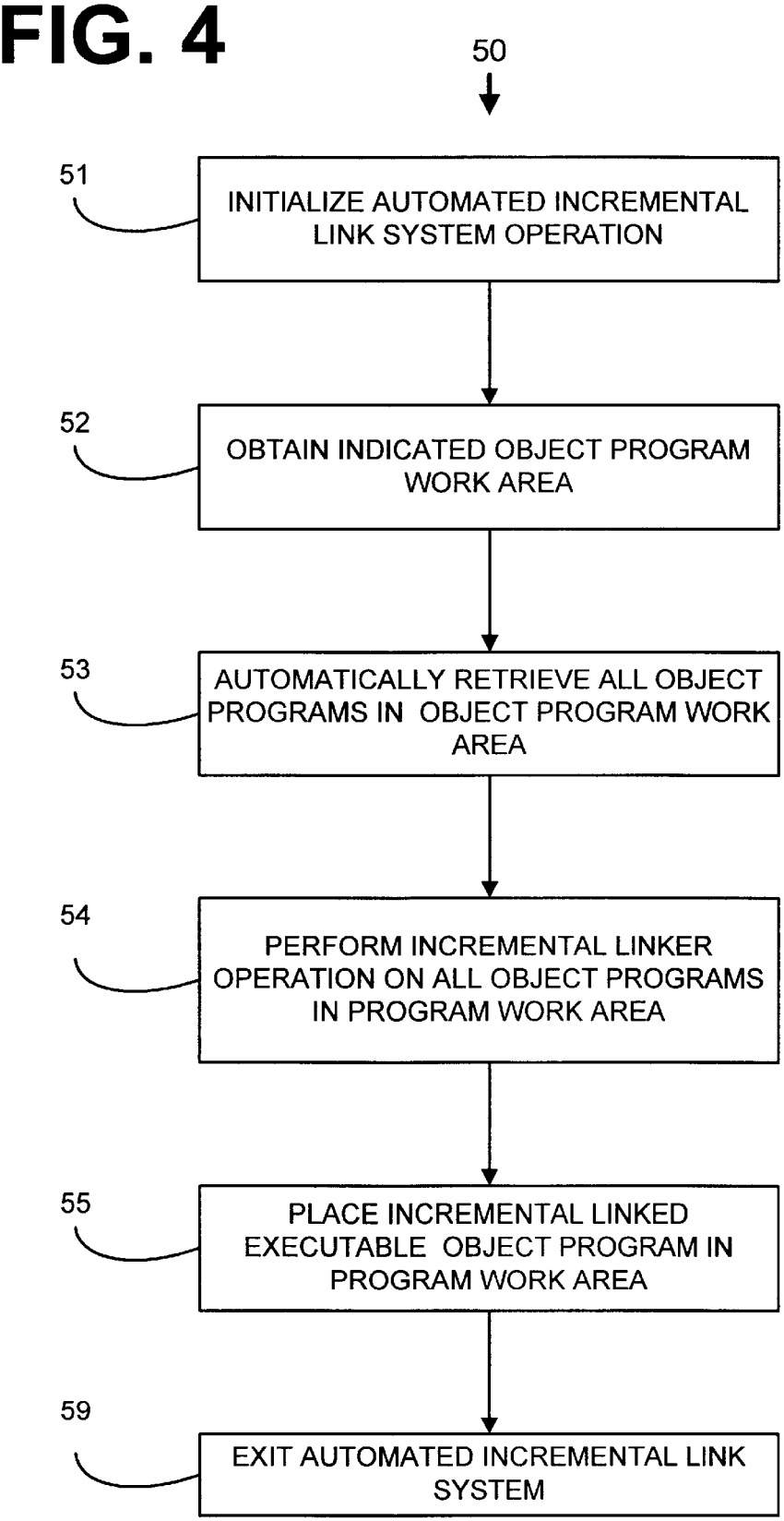

SYSTEM AND METHOD FOR PERFORMING AUTOMATED INCREMENTAL COMPILATION OF COMPUTER PROGRAMS

BACKGROUND OF THE INVENTION

1. Field of the Invention

The present invention is generally related to program development environment and, more particularly, is related to a system and method for performing an automated incremental compilation of computer programs.

2. Description of the Related Art

As is known in the computer and software arts, an executable file (i.e. an executable object program) is typically composed of several separately compiled object modules and libraries. In the past, all of the code necessary to build an executable file was usually linked into one monolithic file.

However, when a developer is developing a new program for a computer system, the new program must be tested as part of the system. In order to test the functionality of the program within the system, the program containing the new functionality must be compiled and linked into an executable file in order to be executed and therefore tested. The link editing of all of the base programs along with the new program containing the new functionality can require a significant amount of time to complete.

Therefore, it is often desirable to utilize a technology that allows a programmer to link edit the new program or changed program into an existing executable system. One way to accomplish this is through the use of incremental linking. The incremental linking is a process in which the link editor modifies the original base executable system, instead of re-generating the executable object. The modified linker generates an executable system from the original executable object and the new code and data is laid over top or placed in areas reserved for new code and data. A method and apparatus for incremental linking is described in the commonly assigned U.S. Pat. No. 5,561,800, entitled "Method and Apparatus for Incremental Linking Modifying Routines into Software", issued on Oct. 1, 1996, herein incorporated in its entirety by reference.

The problem with the current system and methods for incremental linking of modified routines into software is that the current system and methods (1) supports only a single developer at a time and (2) require each developer to manually configure the process set-up.

Heretofore, software developers have lacked a system and method for performing incremental compilation of computer programs in a more efficient way.

SUMMARY OF THE INVENTION

The present invention provides a system and method for performing automated incremental compilation of computer programs. Briefly described, in architecture, the system can be implemented as follows. The system provides for a library generation logic that generates a dynamic link library of a plurality of computer programs, and a work area creation logic that creates a program work area. A program copy logic copies at least one computer program into the program work area to enable the computer program to be modified. A program generation logic generates an executable program that includes all of the computer programs in the program work area and the plurality of computer programs in the dynamic link library.

The present invention can also be viewed as providing a method for automated incremental compilation of computer programs. In this regard, the method can be broadly summarized by the following steps: (1) generating a dynamic link library of a plurality of computer programs; (2) providing a program work area; (3) copying at least one of the plurality of computer programs into the program work area; (4) permitting modification of at least one of the plurality of computer programs in the program work area; and (5) generating an executable program including all of the computer programs in the program work area and the plurality of computer programs in the dynamic link library.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the drawings:

FIG. 4 is a flow chart of an example of the automated incremental link system of the present invention as shown in FIGS. 1–3.

DETAILED DESCRIPTION OF THE INVENTION

The present invention will now be described in detail with reference to the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

Figure 1:
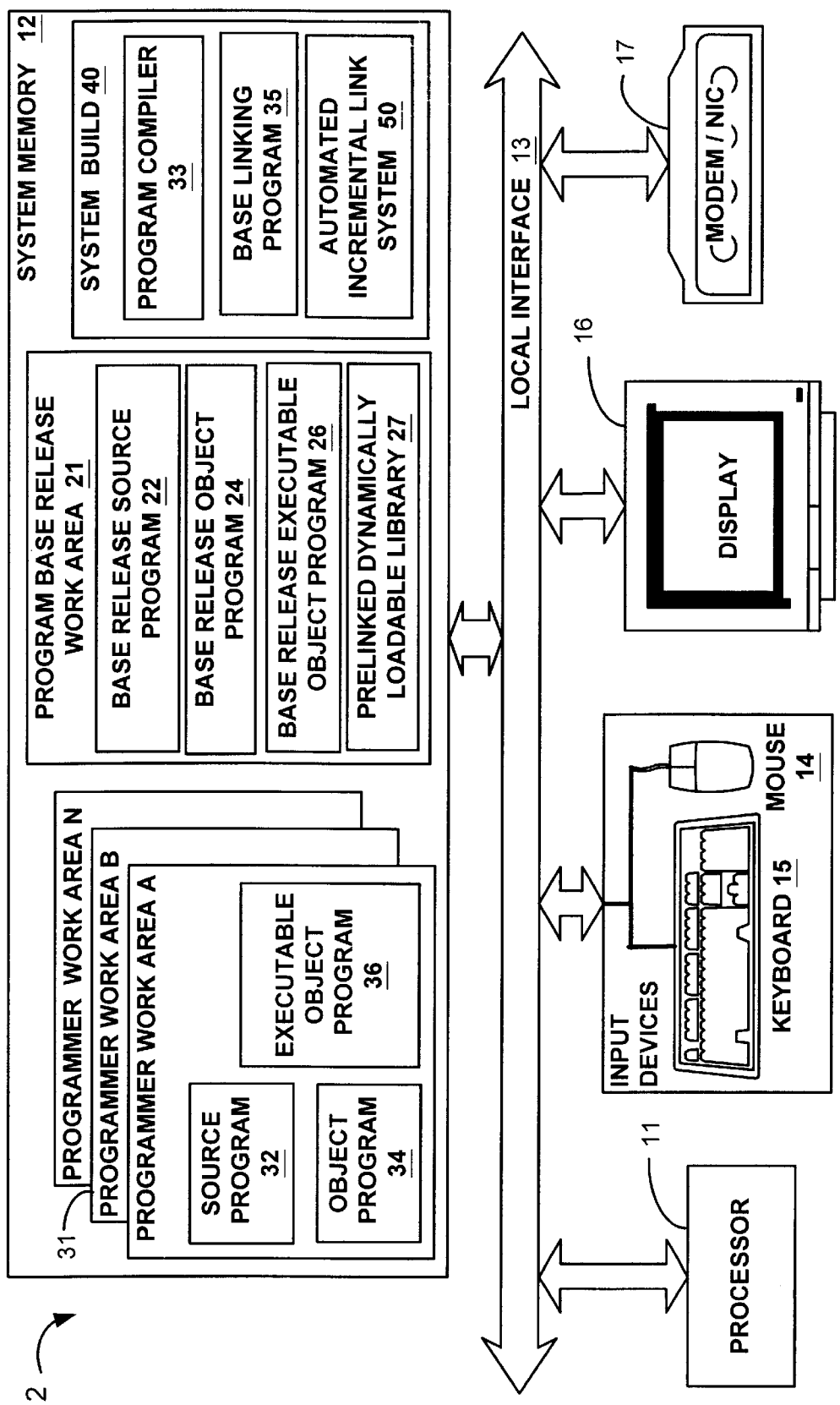
FIG. 1 is a block diagram of a computer system showing the programmer work area, program base release work area, and automated incremental link system of the present invention.

As illustrated in FIG. 1, the computer system 2 comprises a processor 11 and a system memory 12 with an operating system (not shown, which is executed by the processor 11). The processor 11 accepts data from system memory 12 over the local interface (e.g., one or more buses). The system memory 12 can be either one or a combination of the common types of memory, for example, but not limited to, erasable programmable read only memory (EPROM), electronically erasable programmable read only memory (EEPROM), flash memory, programmable read only memory (PROM), random access memory (RAM), read only memory (ROM), flash memory, dynamic random access memory (DRAM), static random access memory (SRAM), system memory, or nonvolatile memory such as disk drives, tape drives, compact disc read only memory (CD-ROM) drives, cartridges, cassettes, or memory located on a network server.

Direction from the user can be signaled to the processor 11 by using one or more input devices, for example, but not limited to, a mouse 14 and keyboard 15. The action input and/or result output can be displayed on an output device, for example, a display device 16. The computer system 2 includes user network interface type programs for use in accessing data on a network. These user network interface type programs (not shown) reside in system memory 12 and access communication facilities modem/network interface card (NIC) 17 to transport to and from other resources connected on a network (not shown).

The automated incremental link system 50 of the present invention can be implemented in hardware, software, firmware or a combination thereof. In the preferred embodiment, the automated incremental link system 50 is implemented in software or firmware that is stored in a memory, such as the system memory 12, and that is executed by a suitable instruction execution system, such as processor 11.

The diagram of FIG. 1 illustrates the preferred embodiment of the automated incremental link system 50 residing in system memory 12 of a server system 2. Also included in the system memory 12 is the programmer work area 31 that contains source program 32, project programs 33 and executable objects programs 36. The base release program work area 21 also resides in system memory 12. The base release program work area 21 includes the base release source programs 22, base release object programs 24, prelinked executable load library 27 and base release executable object program 26.

Source programs 22 and 32 are processed by the program compiler 33. The program compiler 33 generates an object program 24 and 34 (i.e., compiled code) that is placed back into the base release program work area 21 or programmer work area 31. The object program 24 and 34 is processed by a linking program to produce an executable object program 26 and 36. This linking program is either the base linking program 35 or the automated incremental link system 50 of the present invention. The generated executable object program 26 and 36 is placed back into the base release program work area 21 or programmer work area 31 depending upon the location of the object program 24 or 34.

While FIG. 1 shows the configuration of the automated incremental link system 50 of the present invention residing in a server computer system 2, it is contemplated by the inventors that the configuration of the automated incremental link system 50 of the present invention could exist in a distributed architecture. In a distributed architecture, the program developer work areas 31, source program 32, project programs 33 and executable objects programs 36 may physically reside on a program developers stand-alone personal computer (PC) (not shown) or the like. The program developers stand-alone PC then links, via the modem/network interface card 17, to the server computer system 2. The server computer system 2 contains the base release program work area 21 maintaining the base release source programs 22, base release object programs 24, prelinked executable load library 27 and base release executable object program 26. The base release work area 21 may also reside in a different physical computer system as the system build process 40. In this embodiment, the base release work area 21 links, via the modem/network interface card 17, to the program developers stand-alone PC and the system build process 40.

Figure 2:
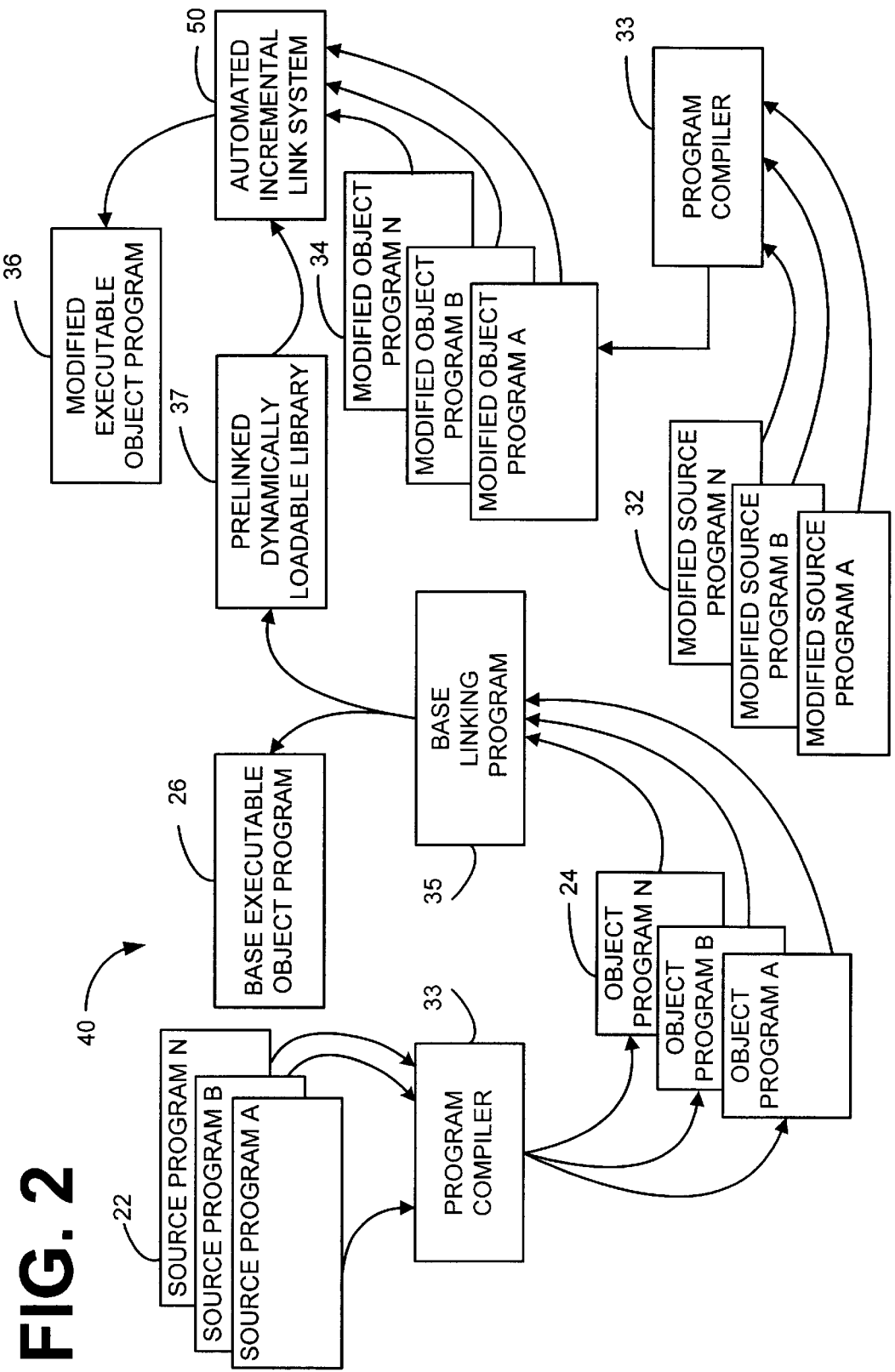
FIG. 2 is a block diagram of the system build process utilizing the automated incremental link system of FIG. 1.

Illustrated in FIG. 2 is a block diagram demonstrating an example of the system build process 40 to convert a base release source program 22 into a base executable object program 26. The base release source program code 22 resides in the program base release work area 21. The compiler 33 accepts the base release source program 22 from the program base release work area 21, and generates a base release object program 24 that is placed back into the program base release work area 21. This base release object program 24, residing in the program base release work area 21, is then linked together with other base release object programs 24 using a base release linking program 35. The base linking program 35 generates a base release executable object program 26 that is available for program testing. The base release linking program 35 also generates a prelinked dynamically loadable library 37 that resides in the base release work area 21.

The prelinked dynamically loadable library 37 is a non-executable object code of all the base release object programs 24. This prelinked dynamically loadable library 37 is the base for the operation of the automated incremental link system 50 of the present invention. The operation of the automated incremental link system 50 allows the program developers to modify base release source programs 22 copied into the program developer's individual work area 31. The program compiler 33 then generates a modified object program 34 (i.e., compiled code) that is also placed back into the program developer's individual work area 31. The modified object program 34 is processed with the prelinked dynamically loadable library 37, by the automated incremental link system 50 of the present invention, to produce a modified executable object program 36. The modified executable object program 36 is also placed back into the program developer's individual work area 31. The modified executable object program 36 can be produced in multiple different versions by multiple program developers, where each program developer operates in their individual programmer work area 31.

In the distributed environments, there can be multiple program base release work areas 21 each representing a different release configuration. With these multiple program base release work areas 21 available, a program developer may utilize the programmer work area 31 to develop and test program functionality for any of the available program base releases.

Figure 3:
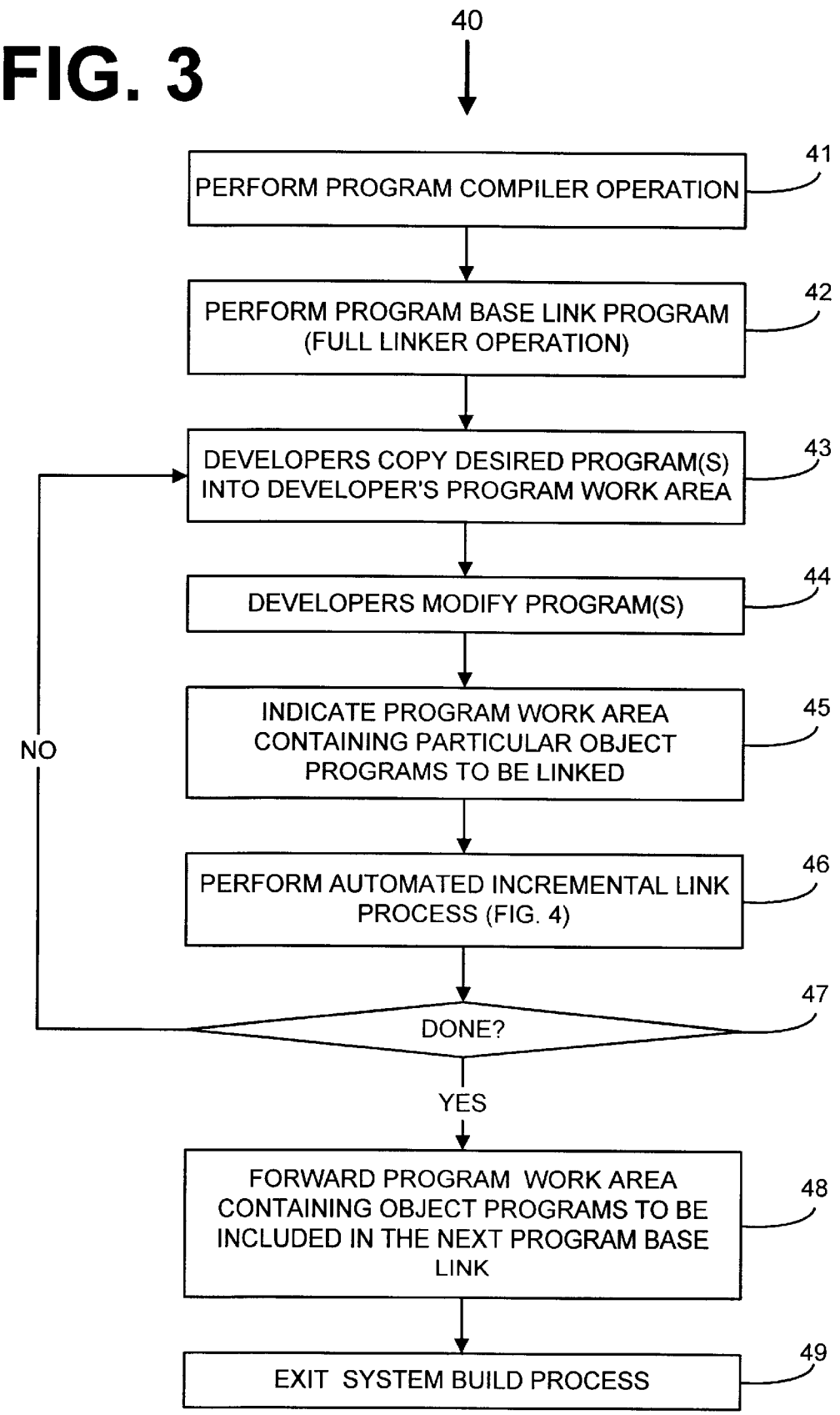
FIG. 3 is a flow chart of the system build process including the automated incremental link system of FIG. 1.

Illustrated in FIG. 3 is a flow chart demonstrating an example process of the system build process 40. The system build process 40 first performs the program compiler 33 operation on the base release source programs 22 at step 41. Next, at step 42, the system build process 40 performs the base release link program 35. The base release link program 35 captures all the base release object code 24 for a particular system to generate a base executable object program 26.

At step 43, the program developer(s) copy the desired base release source program(s) 22 into the program developers work area 31. This way the program developer may modify the source program(s) 32 without causing problems with other program developers testing and system operation. At step 44, the system build process 40 allows the modification of the source programs 32 to be made by multiple program developers.

After allowing the modification of the programs to be made, the system build process 40 receives an indication of which program developer work area 31 contains the particular object programs 34 to be linked at step 45. At step 46, the system build process 40 performs the automated incremental link system 50 of the present invention. The incremental link system of 50 of the present invention is herein defined in further detail with regard to FIG. 4.

After performing the automated incremental link system 50 of the present invention at step 46, the program developer then determines if additional changes are to be made to any program at step 47. If additional changes to any program are to be made, the system build process 40 returns to repeat steps 43–47. If it is determined at step 47 that further modification to any program is not to occur, the system build process 40 forwards the object programs 34 in program developers individual work area 31 for inclusion in the base linking program 35 at step 48. The system build process 40 then exits at step 49.

It should be realized that the system build process 40 provides the ability of multiple program developers to perform modification and testing of multiple source and object programs (32, 34 and 36) concurrently. Therefore, multiple program developers can perform steps 43–48 independently of one another.

Illustrated in FIG. 4 is a flow chart demonstrating an example of the automated incremental link system 50 of the present invention. First, the automated incremental link system 50 is initialized at step 51. At step 52, the automated incremental link system 50 obtains the indicated program developer's individual work area 31. The automated incremental link system 50 then automatically retrieves all of the object programs 34 in the program developer's individual work area 31, at step 53. During this retrieval operation, the automated incremental linker system 50 identifies all of the object programs 34 in the program developer's individual work area 31. In an alternative embodiment, the automated incremental linker system 50 determines which of the object programs 34 identified in the program developer's individual work area 31 are modified. The automated incremental linker system 50 can determine which object programs 34 are modified by using any number of know methods, such as, but not limited to: flag settings, comparing date/time of file creations and the like.

At step 54, the automated incremental linker system 50 operation is performed on all object programs 34 within the program developer's individual work area 31. In an alternative embodiment, the automated incremental linker system 50 operation is performed on only the object programs 34 that were modified within the program developer's individual work area 31. The automated incremental link system 50 places the incremental link executable object program 36 into the program developer's individual work area 31 for execution at step 55. The automated incremental link system 50 then exits at step 59.

The automated incremental link system 50 comprises an ordered listing of executable instructions for implementing logical functions, and can be embodied in any computer-readable medium for use by or in connection with an instruction execution system, apparatus, or device. The instruction execution system, apparatus, or device includes for example but is not limited to, a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to automate the incremental compilation of computer programs, the method comprising the steps of:

linking a dynamically loadable library of a plurality of precompiled object code routines suitable for use by a plurality of executable computer programs, the dynamically loadable library comprising non-executable object code representations of base release object programs;

providing a program work area configured to accept a source version of each of the plurality of base release object programs, the program work area further configured to permit modification of said source versions of the plurality of base release object programs;

generating at least one modified object program within said program work area responsive to source version modification of an associated base release object program; and producing a modified executable object program responsive to the at least one modified object program and the dynamically loadable library, wherein the program work area retains executable object programs for modified object programs and relies on said library to retain the unmodified base release object programs.

2. The method of claim 1, wherein the step of producing a modified executable object program, further comprises the step of:

identifying the modified object program in said program work area.

3. The method of claim 2, further comprising the step of:

placing said at least one modified executable object program into said dynamic link library in response to a request to publish the modified executable object program.

4. The method of claim 1, further comprising the step of:

providing a plurality of program work areas wherein each program work area is associated with a programmer.

5. A system for automating the incremental compilation of computer programs, comprising:

a processor;

an interface communicatively coupled to the processor; and a system memory communicatively coupled to the processor and to the interface, the system memory comprising:

a library logic that manages a plurality of dynamically loadable, previously linked, and precompiled object code routines suitable for use by executable computer programs, wherein the dynamically loadable library comprises non-executable object code representations of base release object programs;

a work area logic that creates a program work area configured to accept a source version of each of the base release object programs, the program work area further configured to enable modification of said source versions of the plurality of base release object programs; and an incremental build logic that generates at least one modified object program in said program work area, the at least one modified object program responsive to source version modification of an associated base release object program and a modified executable object program responsive to the at least one modified object program and the dynamically loadable library wherein said program work area retains executable object programs for modified object programs and relies upon said library to retain unmodified base release object programs.

6. The system of claim 5, further comprising:

an identification logic that identifies the modified object program in said program work area.

7. The system of claim 5, further comprising:

a placement logic that places said at least one modified executable object program into said work area.

8. The system of claim 5, further comprising:

a library placement logic that links said at least one modified executable object program with said dynamic link library.

9. The system of claim 5, wherein said work area creation logic further comprises:

logic that creates a plurality of program work areas wherein each program work area is associated with a programmer.

10. A system for automating the incremental compilation of computer programs comprising:

means for generating a dynamically loadable and previously linked library comprising a plurality of precompiled object code routines suitable for use by executable computer programs, the dynamically loadable library comprising non-executable object code representations of base release object programs;

means for providing a program work area configured to accept a source version of each of the plurality of base release object programs, the program work area further configured to permit modification of said source versions of the plurality of base release object programs in said program work area;

means for generating at least one modified object program within said program work area responsive to source version modification of an associated base release object program; and means for producing a modified executable object program responsive to the at least one modified object program and the dynamically loadable library within said program work area, wherein said library retains the unmodified base release object programs and only modified object programs are placed within said program work area.

11. The system of claim 10, wherein said means for generating at least one modified object program within said program work area further comprises:

means for identifying the at least one a modified object program in said program work area.

12. The system of claim 10, further comprising:

means for linking said at least one modified executable object program with said dynamically loadable library.

13. The system of claim 10, wherein said means for providing a program work area configured to accept a source version of each of the plurality of base release object programs further comprises:

means for providing a plurality of program work areas wherein each program work area is associated with a programmer.

14. A computer-readable medium for automating the incremental compilation of computer programs, comprising:

means recorded on said medium for generating a dynamically loadable and previously linked library comprising a plurality of precompiled object code routines suitable for use by executable computer programs, the dynamically loadable library comprising non-executable object code representations of base release object programs;

means recorded on said medium for creating at least one program work area configured to accept a source version of each of the plurality of base release object programs, the program work area further configured to permit modification of said source versions of the plurality of base release object executable computer programs in said program work area; and means recorded on said medium for generating at least one modified object program within said program work area responsive to source version modification of an associated base release object program; and means recorded on said medium for producing a modified executable object program responsive to the at least one modified object program and the dynamically loadable library wherein said library retains unmodified base release object programs and only modified object programs are placed within said program work area.

15. The computer-readable medium of claim 14, wherein said means recorded on said medium for generating at least one modified object program further includes:

means for identifying a modified object program in said program work area.

16. The computer-readable medium of claim 14, wherein said means recorded on said medium for generating at least one modified object program further includes:

means for linking said at least one modified executable object program with said dynamic link library.

17. The computer-readable medium of claim 14, wherein said means recorded on said medium for generating at least one modified object program further includes:

means for providing a plurality of program work areas wherein each program work area is associated with a programmer.

\* \* \* \* \*